Dec. 13, 1960
A. F. SCHECTER
2,964,613
LAMP CONTROL
Filed Dec. 9, 1958
2 Sheets-Sheet 1
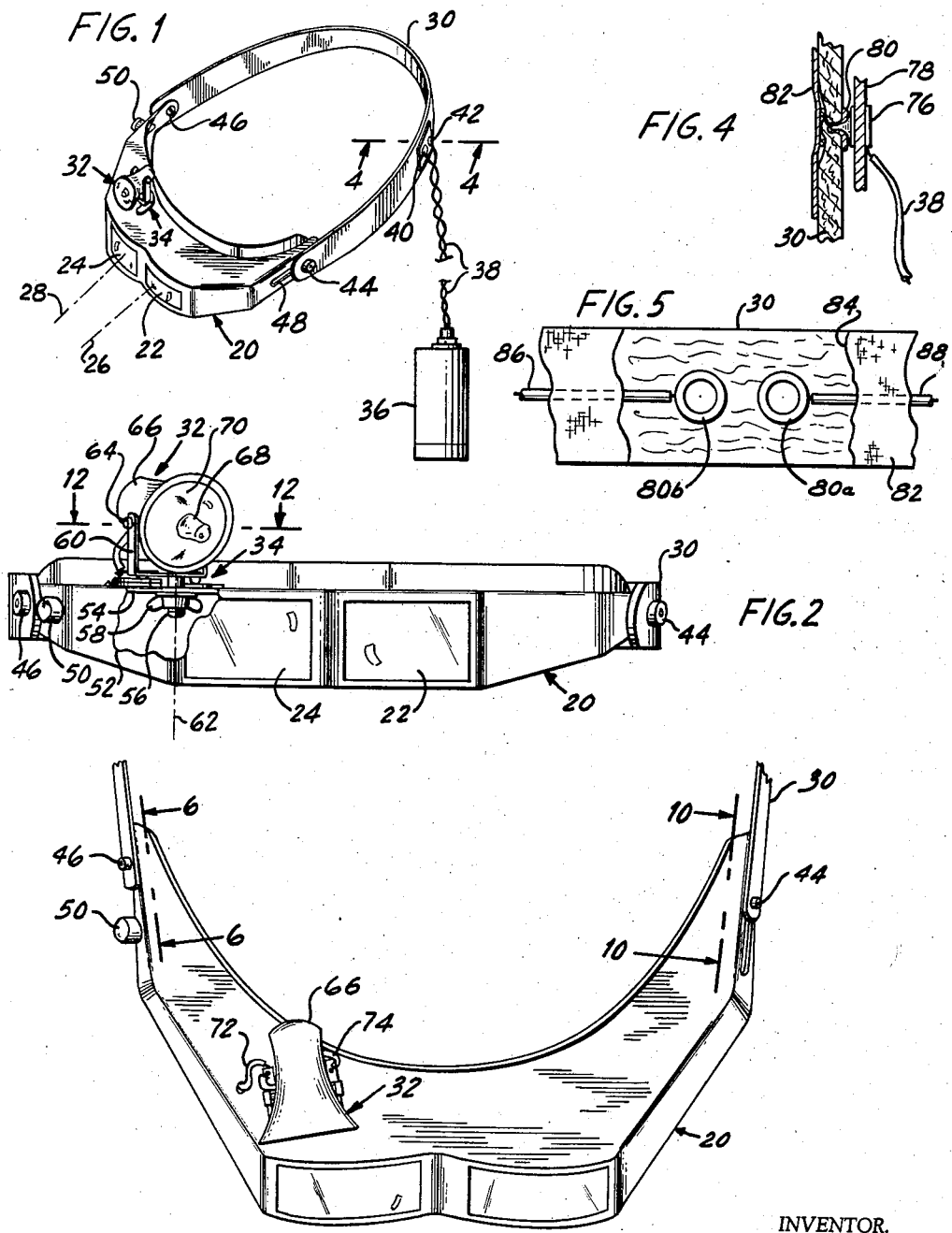
INVENTOR.
A. FRANCIS SCHECTER
BY
ATTORNEY Dec. 13, 1960  A. F. SCHECTER  2,964,613
LAMP CONTROL
Filed Dec. 9, 1958  2 Sheets-Sheet 2
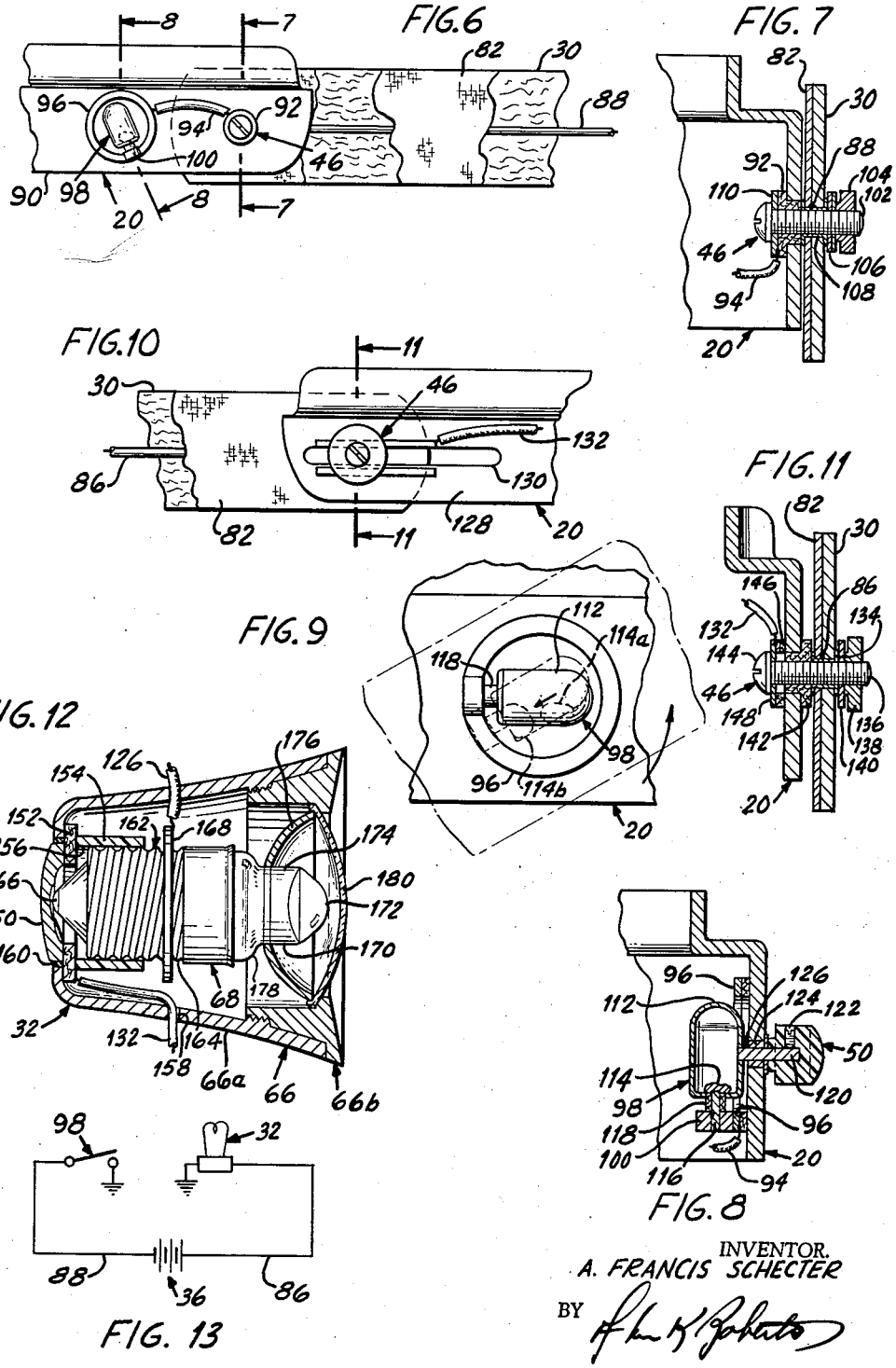
INVENTOR.
A. FRANCIS SCHECTER
BY
ATTORNEY

United States Patent Office 2,964,613
Patented Dec. 13, 1960

2,964,613
LAMP CONTROL

Aaron Francis Schecter, West Englewood, N.J.
(12 E. 86th St., New York 28, N.Y.)

Filed Dec. 9, 1958, Ser. No. 779,182

4 Claims. (Cl. 240—2)

This invention relates to lamp controls, and more particularly to controls for illumination devices adapted to be supported on the human body.

The invention specifically contemplates the provision of improved headlamps such as, for example, might be employed by dentists, doctors, jewelers and the like. It is an object of the invention to provide improved illuminating apparatus which is automatically actuated without the need for manual control.

It is another object of the invention to provide lamp controls which are conveniently and economically fabricated in the form of completely self-contained units.

A further object of the invention is to provide for an automatic control which is adjustable independently of the associated light source.

In the case of using the tilting of the head, for example, for control purposes different degrees of movement may desirably cause illumination under different circumstances and the invention accordingly makes provision therefor.

To achieve the above indicated and other of its objectives, the invention provides a structure with a gravitationally responsive actuating device controlling a source of light. The actuating device may, for example, be a mercury switch. For adjustment purposes, the switch includes contacts, the position of which (relative to the part of the body on which the switch is to be mounted) is adjustable.

Further the invention contemplates the provision of a light source which is supported for universal adjustment, thus making it possible to adjust the lamp itself independently of the remainder of the apparatus. This permits directing a beam of light so that it intersects the line of sight of the lens system at a distance from the lens system which corresponds selectively with the focal length of the latter. The light source can be adjusted in advance of its use and, when it is combined with the aforenoted gravity-response feature, an exceedingly convenient and useful source of light is provided.

Other objects, features and advantages of the invention will be found in the following description of a preferred embodiment of the invention as illustrated in the accompanying drawing, in which:

Fig. 1 is a perspective view of a headlamp provided in accordance with the invention;

Fig. 2 is a front view of the headlamp of Fig. 1 with the battery removed;

Fig. 3 is a top plan view of a front portion of the headlamp of Fig. 1;

Fig. 4 is a sectional view taken along line 4—4 of Fig. 1;

Fig. 5 is a view of a part of the strap of the structure shown in Fig. 1, indicating power terminals;

Fig. 6 is a partially sectioned view of the structure indicated by arrows 6 in Fig. 3;

Fig. 7 is a sectional view taken along line 7—7 in Fig. 6;

Fig. 8 is a sectional view taken along line 8—8 in Fig. 6;

Fig. 9 is an enlarged view of a gravitationally responsive switch, the chain lines indicating one of many positions which the switch may controllably assume;

Fig. 10 is a view of a portion of the structure indicated by arrows 10 in Fig. 3;

Fig. 11 is a sectional view taken along line 11—11 in Fig. 10;

Fig. 12 is a partially sectional view taken along line 12—12 in Fig. 2; and

Fig. 13 illustrates diagrammatically the electric circuit employed in the structure of the invention.

Inasmuch as the invention is best understood when considered with respect to a particular environment, a preferred embodiment of the invention will be described with respect to the provision of a headlamp normally to be employed by a dentist. The structure will be illustrated as provided with a gravitationally responsive switch which is employed to couple a power source to a light source. The switch functions to connect the power source to the light source upon the tilting of the dentist's or operator's head to a determinable angle, so that only when the dentist's eyes are in correct position to view his patient is the light source actuated to illuminate the patient.

A headlamp of the nature indicated above is generally shown in Fig. 1, wherein the structure comprises a head piece or forehead piece 20 including lenses 22 and 24, the lines of sight of which are respectively indicated at 26 and 28. Affixed to the head piece 20 is a strap or band 30 which may be adjustable if desired and which serves to hold the forehead piece 20 on the frontal portion of the head of the operator or user.

A light source 32 is mounted atop the head piece 20 by means of a universal support 34, the function of which is to enable the light source 32 to be directed in any desired direction. This enables the operator to pre-adjust his light source so that it intersects with the lines of sight of the lenses 22 and 24 at the focal lengths of the lenses, so that a viewed object is properly illuminated when the lenses are properly spaced from the object.

Coupled to the light source 32 by means which will be hereinunder described in greater detail is a power source or battery 36. The battery 36 is connected to the band 30 by means of flexible wires or lead lines 38. To accommodate the lead lines 38 there are provided terminals 40 and 42, the connection of which in the circuitry of the light source 32 will be subsequently made apparent.

The strap 30 is preferably connected to the forehead piece 20 by means of wingnut and bolt arrangements 44 and 46 which may be accommodated in elongated slots such as indicated, by way of example, by the slot 48. The use of the slot enables different sizes of heads to be accommodated.

One of the principal features of the invention is illustrated rather diagrammatically in Fig. 1 in the form of a knob or control 50 which is operatively associated with a gravitationally responsive switch coupled in the circuitry of the light source 32. The gravitationally responsive switch achieves the purpose of controlling the light source 32 in response to the movement of the part of the body upon which the headlamp is mounted and the control 50 provides a controlled response of the switch to different predetermined angular movements.

To facilitate an understanding of the operation of the gravitationally controlled switch in the apparatus of the invention, reference will hereinafter be made to the gravitational direction or direction of gravitational forces. This terminology is employed in its conventional sense to mean a vertically downward direction, the angular deviation from this direction by the switch and its components controlling the closing of the circuit between the power source 36 and the light source 32.

Fig. 2 shows a front view of the headlamp shown in perspective in Fig. 1. This view further illustrates the conventional relative positions of lenses 22 and 24 and indicates the attachment of the band 30 to the forehead piece 20 by wingnut and bolt arrangements 44 and 46. This view is partially broken away, as at 52, so as to illustrate fully the universal support 34 which is employed to mount the headlamp 32.

As is seen in Fig. 2, the forehead piece 20 includes a generally horizontal section 54 which is provided with an aperture to accommodate the threaded bolt 56. The threaded bolt 56 accommodates a wingnut 58 beneath the horizontal section 54 to maintain in fixed rigid position a yoke or bail 60. The yoke 60 is pivotal about a vertical axis of rotation 62. Moreover, the yoke 60 is provided with horizontally aligned pivots, of which the horizontal pivot 64 is shown. Supported by the pivot 64 is a casing or housing 66. The casing 66 is pivotal on the horizontal axis of rotation defined by the horizontal pivot 64 and additionally on the vertical axis of rotation 62. The casing 66 is therefore pivotal in substantially unrestricted manner so as to enable the light source 32 to direct a beam of light in substantially any desired direction.

The light source 32 further comprises a miniature lamp 68 and a reflector 70, the arrangement and function of which will be described hereinafter.

The top plan view of the front portion of the headlamp is illustrated in Fig. 3. This figure indicates generally the forehead piece 20, the band 30, and wingnut and bolt arrangements 44 and 46. Also illustrated is the mechanical or structural relationship between the control 50 of the gravitationally responsive switch and the light source 32. In general, it is to be noted that both of the members 32 and 50 are mounted on the forehead piece 20 which is of a rigid, lightweight, conductive material such as aluminum or the like. A movement imparted to the light source 32 is thus also imparted to the control 50 and, as will be shown, to the gravitationally responsive switch.

Fig. 3 also serves to illustrate the mechanical positioning of flexible lead lines 72 and 74, which are operatively associated with the miniature lamp 68 (Fig. 2) for purposes of supplying electrical power to the latter.

As noted above, the light source is functionally connected with a battery or like source of electrical power 36, by means of lead lines 38. As shown in Fig. 4, which is a sectional view along line 4—4 of Fig. 1, each of lead lines 38 is connected to a metallic terminal 76, which is attached to the band and which further is centered into a small metallic socket 80 in conventional manner. The metallic socket 80 penetrates through the band 30 and in effect constitutes an eyelet embossed thereto. On the inside surface of the band 30 is provided an insulating layer 82 which serves to shield the head of the user or operator from that portion of the socket 80 which extends inwardly of the band.

It will be, of course, appreciated that the eyelets are actually two in number, and this is indicated in Fig. 5 by the provision of eyelets 80a and 80b. The internal make-up of the band is indicated with a portion thereof broken away, as at 84, to illustrate the relative positioning and spacing of the eyelets 80a and 80b. Connected to the metallic eyelets 80a and 80b are two lead lines or wires 86 and 88 embodied within the band material. These wires make electrical contact with eyelets 80a and 80b and serve to conduct the power from the lead lines 38 and terminals 80 to the gravitationally responsive switch and to the light source 32. The band 30 and the wires 86 and 88 run laterally within the band material to a position substantially at the temples of the operator, the connections in these latter zones being described in greater detail hereinunder.

Fig. 6 illustrates, by way of example, the connection of line 88 to the gravitationally responsive switch employed in accordance with the invention. The view indicated in Fig. 6 is that indicated by arrows 6 in Fig. 3.

Fig. 6 illustrates the right lateral portion of band 30, insulating material 82 (partially broken away), and wire 88. This figure also illustrates the right lateral rearmost portion 90 of the forehead piece 20. The wire 88 is electrically connected to the wingnut and bolt arrangement 46, which pivotally fixes the band 30 to the forehead piece 20 on the right side of the head of the operator. The forehead piece 20 is metallic and, therefore, electrically conductive. The wingnut and bolt arrangement 46 comprises an insulating arrangement including a washer 92, the function of which in conjunction with other elements is to provide for an electrically isolated circuit which is independent of the forehead piece 20. As a continuation of this circuit, there is provided a lead line or wire 94 which is electrically coupled to an electrically conductive ring 96, which is fixedly mounted on the forehead piece 20 and which is preferably insulated from the latter.

The gravitationally responsive switch is indicated generally in the form of a mercury switch 98. The specific details of this switch will be subsequently described in detail, and it is sufficient at this point to note simply that the mercury switch includes a brush member 100 which slidably and frictionally engages the ring 96.

Fig. 7 is a sectional view taken along line 7—7 of Fig. 6 and illustrates in greater detail the connection of wire 88 to the wingnut and bolt arrangement 46. Fig. 7 illustrates the band 30 provided with insulating layer 82 and embedded therein the wire 88. The wingnut and bolt arrangement includes a threaded bolt 102, which threadably accommodates a wingnut 104. For mechanical purposes, a washer 106 is provided beneath the wingnut 104, and the bolt 102 is itself accommodated within a metallic, electrically conductive eyelet 108, to which the wire 88 is connected. As noted above, the bolt 102 is electrically insulated from the forehead piece 20 by an insulating washer 92. A further washer, which is however, of electrically conductive material, is indicated at 110. An electrically conductive circuit is, therefore, provided as follows: the wire 88, the eyelet 108, the bolt 102, the washer 110, and the wire 94. As noted above, the wire 94 is connected to the mercury switch 98.

The mercury switch 98 which constitutes the gravitationally responsive switch of the invention is shown in greater detail in Figs. 8 and 9. In these figures, the mercury switch 98 is seen to comprise an elongated casing 112 which defines an interior chamber in which is housed a small body or globule 114 of mercury. The casing 112 of the mercury switch 98 is of an electrically conductive, lightweight material, such as for example, aluminum or the like. Extending outwardly from the casing is a conductive post 116 which is aligned with the longitudinal axis of the casing, and which is supported on and partially within the casing by a collar 118. The collar 118 is of an electrically insulating material, such as plastic, ceramic, or the like, and divides the mercury switch into two independent electrically conductive portions, respectively comprising the casing 112 and the post 116. These independent electrically conductive portions effectively constitute the contacts of a switch, and these contacts are bridged or electrically connected together by operation of the mercury globule 114, as will be seen.

In Figs. 6 and 8 is indicated the wire 94, which is electrically coupled to the ring 96 which is insulated from the headpiece. The ring 96 is, as noted above, frictionally engaged by the brush member 100, which is electrically coupled to the post 116. As a consequence, the power source 36 (see Fig. 1) is electrically coupled to the post 116.

The post 116 may or may not be connected to the casing 112 which, as will be shown, is electrically coupled to the light source 32. If the mercury globule 114 is in position to bridge the post 116 and the casing 112, electrical continuity is provided. If the globule 114 is spaced from the post 116, the associated electrical circuit is open.

The position of the casing 112 is controlled by the knob 50. More particularly, an electrically conductive post or shaft 120 is affixed centrally of the casing 112, from which the post laterally extends. Externally of the forehead piece 20, the post 120 is engaged by the knob 50, which is provided with a set screw 122 for this purpose. Preferably, the post 120 is electrically insulated from the forehead piece 20 by means of a washer or collar 124. A further wire 126 may be coupled to the post 120 and insulated from the forehead piece 20. The wire 126 is thus electrically connected to the wire 94 by means of the mercury switch 98.

In Fig. 8, the mercury switch is shown with its longitudinal axis in substantially vertical position. When the casing 112 is in the position illustrated in Fig. 8, the mercury globule 114 is positioned at the bottom of the casing 112, whereat it bridges the post 116 and casing 112. This electrically connects the wire 94 to the wire 126. For this operation, it is assumed that the casing 112 is vertically aligned and that, correspondingly, the forehead piece 20 is in a horizontal position.

In Fig. 9, there is shown in solid lines the casing 112 with its longitudinal axis horizontally aligned. The position of the mercury globule in this instance is indicated at 114a. In this position, the globule does not bridge the post and casing, and accordingly the associated electrical circuit is open. In chain lines, Fig. 9 illustrates the mercury switch slightly tilted, with the post inclined downwardly and with the globule in position 114b. These various positions of the globule will be hereinafter employed to explain the operation of the device.

Referring next to the connection of the wire 86 in the electrical circuit of the apparatus, reference is next made to Fig. 10. In this figure, the portion of band 30 which extends along the left hand side of the head of the operator is shown along with a portion of the insulating lining 82. As indicated, the wire 86 is sandwiched between these elements. Fig. 10 also indicates the portion 128 of the forehead piece 20, which portion is the rearmost extension of the forehead piece on the left hand side of the latter. The wire 86 is electrically connected to the wingnut and bolt arrangement 46 which serves to connect the band 30 to the forehead piece 20. For this purpose, the forehead piece 20 defines an elongated slot 130, which provides for adjusting the position of wingnut and bolt arrangement 46. A movement of the wingnut and bolt arrangement 46 with respect to slot 130 serves to control the effective length of band 30, so that the band may be controlled to accommodate different sizes of heads. Further indicated in Fig. 10 is a wire 132, which electrically couples the wingnut and bolt arrangement 46 to light source 32 (Fig. 1) in a manner which is best indicated with reference to Fig. 11.

In Fig. 11 is indicated the band 30 and the insulating lining 82 sandwiching the wire 86, which is electrically connected to an eyelet 134 within which is accommodated the threaded bolt 136 of the wingnut and bolt arrangement 46. Threadably engaged on bolt 136 is a wingnut 138. A washer 140 is provided for structural purposes.

The bolt 136 is supported in the forehead piece 20 by means of a washer or collar 142 of insulating material. The head 144 of bolt 136 is insulated from forehead piece 20 by an insulating strip 146 which runs longitudinally along slot 130 (Fig. 10). Extending along insulating strip 140 is a conductive strip 148 which makes electrical contact with the head 144 of bolt 136. The wingnut and bolt arrangement 46 is thereby enabled to make longitudinal movements in the slot 130, while the associated electrical circuit remains uninterrupted.

The wire 132 of Fig. 10 and the wire 126 of Fig. 8 are indicated in Fig. 12 in operative association with the light source 32. Light source 32 comprises, as noted above, a casing 66 which is fabricated in two separate but threadably engaged portions 66a and 66b.

At the rear of casing 66 is positioned an electrically conductive terminal button 150, adjacent which is positioned a washer 152 of insulating material. Affixed on the washer 152 is a cylinder 154, which is also of insulating material and the internal surface 156 of which is smooth and preferably not threaded. The wire 132 passes through an aperture 158 in the casing 66 and thence between the washer 152 and the cylinder 154 (by means of which it is electrically isolated from the casing) to the terminal 150. The terminal 150 is electrically isolated from the casing 66, as indicated at 160.

The cylinder 154 internally and loosely accommodates the electrical terminal portion 162 of the miniature lamp 68. This portion of the lamp is conveniently made of first and second independent electrically conductive portions 164 and 166. Portion 166 is connected to wire 132 through the intermediary of terminal 150, and portion 164 is connected to wire 126 through the intermediary of an electrically conductive ring 168.

The lamp further consists of a glass envelope 170, which constitutes the light permeable end of the bulb. The lamp is also provided with a magnifying bead 172, which is positioned in the extremity of the bulb which is opposite to the electrically conductive extremity 162.

The miniature lamp 68 fits loosely in the cylinder 154, as noted above. For purposes of automatically and efficiently centering the lamp 68, not only in the casing 66 but as well with its functionally associated components, the narrow section 174 of the lamp 68 is accommodated within the central aperture provided in the reflector 176. Reflector 176 rests against the shoulder 178 of the lamp. A concave lens 180 peripherally abuts the reflector 176 and rests within the casing portion 66b. The result of this structure is that the reflector lens and bulb may be readily assembled and demounted, with provision being made for an automatic centering of the various parts by the self-positioning reflector 176, i.e., the lamp collar will position the reflector so that the bulb filament, bulb lens, and reflector, are definitely and correctly positioned and centered with each other for the maximum light reflection along the central axis of the various components.

There is distinct advantage in providing the particular type of assembly which has been illustrated with respect to providing preferred fields of illumination. In the illustrated structure, the bead 172 is positioned intermediate the reflector 176 and the concave lens 180. The bead 172, therefore, essentially constitutes the source of light, and the dark or shadowy areas of the field which might be caused by the incandescent filament (not shown) cease to exist. With the bead 172 constituting the source of light and the reflector 176 effectively shielding the incandescent filament, a homogeneous field of illumination results, in which the central portion has substantially the same degree of illumination as the peripheral portions of the field.

The general electric circuit of the apparatus and the function thereof will next be described with reference to Fig. 13, as well as to the structure described above.

In Fig. 13, power source 36 is connected respectively by lines 86 and 88 to the light source 32 and gravitationally responsive switch 98. The switch and light source may be directly connected together, or they may be grounded as, for example, through the forehead piece 20. In any event, a closing of the switch 98 causes the light source 32 to be lighted, and an opening of the switch 98 causes the light source 32 to be inactive.

It follows from what has been stated above that the position of the mercury globule 114 causes the switch 98 to be either opened or closed. The position of the mercury globule 114 depends on two factors, to wit: the position of the casing 112 due to the adjustment of the knob 50 and the position of the forehead piece 20 relative to a horizontal plane or to the direction of gravitational forces. Both of these factors have combined effects upon the operation of the switch 98.

Assuming the forehead piece 20 to be horizontal, as shown in Fig. 8, and the longitudinal axis of the casing 112 to be vertically disposed, as indicated in this figure, the globule 114 will close the circuit. This means that light source 32 will be actuated. These conditions correspond to the situation where the operator's head is held in normal position, so that Fig. 8 shows the situation whereby the light source 32 is actuated with the operator's head in normal alignment.

In Fig. 9, the mercury switch 98 is shown with its longitudinal axis horizontally aligned. The mercury globule assumes the position shown at 114a and the switch is opened. Thus, with the forehead piece 20 horizontally aligned (as would correspond to a normal positioning of the operator's head), the switch 98 is opened and the light source 32 inactive.

Fig. 9 illustrates in chain lines the same alignment of the casing 112 with respect to the forehead piece 20, but in this instance the operator's head has been tilted forward through a determinable angle relative to the direction of the gravitational forces. This brings the mercury globule into the position indicated at 114b and closes the switch, thereby actuating the light source 32. The significance of this is that the mercury switch has a position relative to the forehead piece 20, by means of which the switch 98 remains open with the operator's head in normal position. However, with this alignment, a tilting of the operator's head through a determinable angle closes the switch 98 and causes the light source 32 to be actuated. As a result, the light source 32 is actuated only upon a determinable angular displacement of the associated gravitationally responsive switch and, in accordance with a feature of the invention, this angle is controllable.

The knob 50 provides for the necessary control, since it adjusts the longitudinal axis of the casing 112 of the mercury switch relative to the forehead piece 20. The remaining angular movement necessary to close the switch is provided by the operator's head. The two angular adjustments automatically and algebraically are combined to effect an actuation of the device and the illumination of an object to be viewed.

In summary, the structure of the invention provides for conveniently adapting the position of a light source to the lines of sight of the associated lenses, by means of universal support 34. Furthermore, provision is made for automatically switching on a light source when an operator's head has been moved through a determinable and adjustable angle, by means of the mercury switch or gravitationally responsive device 98. Moreover, provision is made for providing a substantially homogeneous field of illumination to enhance the use of the aforegoing features.

There will now be obvious to those skilled in the art many modifications and variations of the structures and methods indicated above. These modifications and variations will not, however, depart from the scope of the invention, as defined in the following claims.

I claim:

1. A headlamp comprising a forehead piece, a light source, means adjustably supporting said light source on said forehead piece, means for attaching said forehead piece to the head of an operator, a mercury switch, means supporting said switch adjustably on said forehead piece, the adjustment of said switch being independent of the adjustment of said light source, a power source connected by said switch to said light source, the means supporting said switch supporting the same for rotation adjacent said forehead piece and slide means on said forehead piece and frictionally engaged by said switch, said slide means coupling said switch to said light source and engaging said switch in all positions of the latter.

2. A headlamp as claimed in claim 1 wherein said switch is rotatable through three hundred and sixty degrees.

3. A headlamp as claimed in claim 2 wherein the means supporting said switch comprises a shaft rigidly coupled to the switch and a knob rigidly coupled to said shaft.

4. A headlamp as claimed in claim 3 wherein said knob, shaft and switch have a common axis of rotation.

References Cited in the file of this patent

UNITED STATES PATENTS

| | | |
|---|---|---|
| 1,741,264 | Wappler | Dec. 31, 1929 |
| 1,925,593 | Long | Sept. 5, 1933 |
| 2,165,531 | Bertrand | July 11, 1939 |
| 2,176,789 | Capitani | Oct. 17, 1939 |
| 2,196,543 | Anderson | Apr. 9, 1940 |
| 2,794,908 | Evans | June 4, 1957 |

FOREIGN PATENTS

| | | |
|---|---|---|
| 403,046 | Great Britain | Dec. 14, 1933 |